Jan. 24, 1956  S. F. MARINO  2,731,857
DRIVING MECHANISM FOR CYCLES
Filed March 2, 1950  2 Sheets-Sheet 2
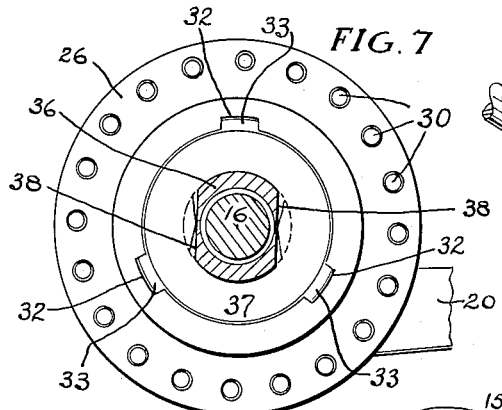
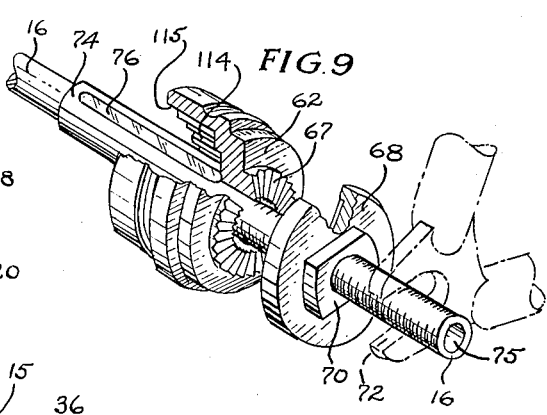
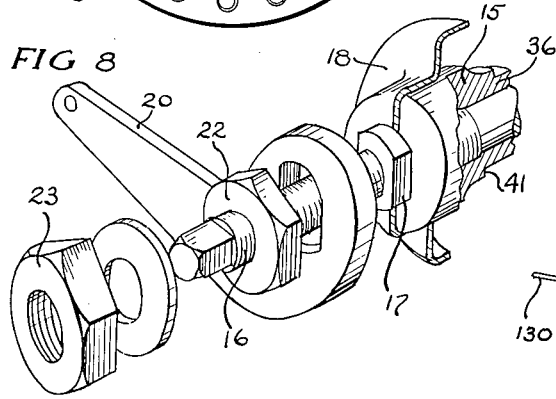
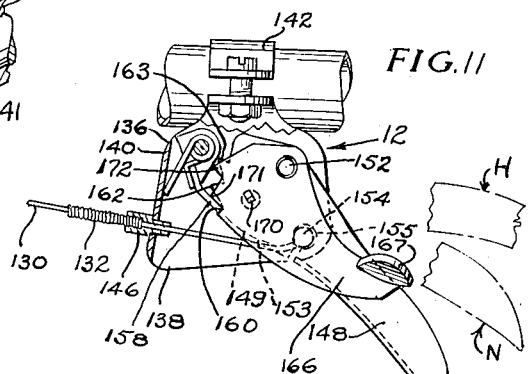
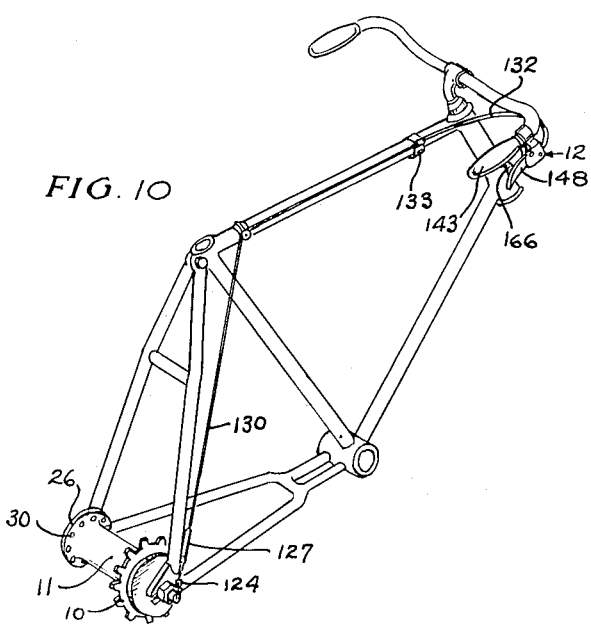
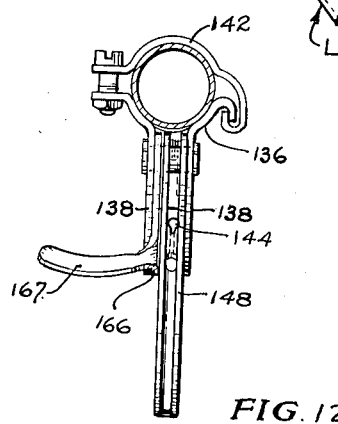
INVENTOR;
SALVATORE F MARINO.
BY Romayn A. Spare
HIS ATTORNEY.

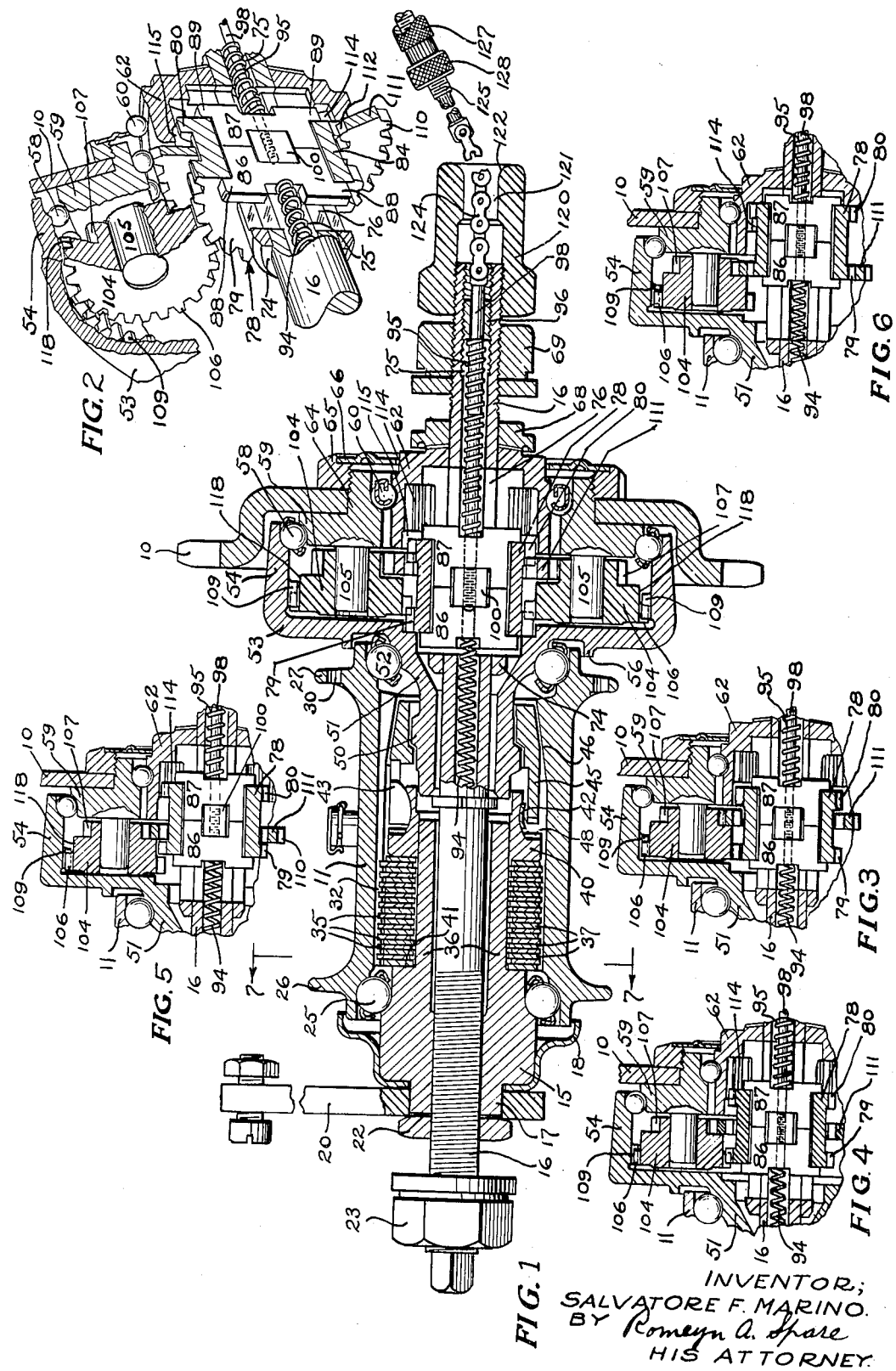

United States Patent Office 2,731,857
Patented Jan. 24, 1956

2,731,857

DRIVING MECHANISM FOR CYCLES

Salvatore F. Marino, Bristol, Conn., assignor to General Motors Corporation, Detroit, Mich., a corporation of Delaware Application March 2, 1950, Serial No. 147,289

8 Claims. (Cl. 74—781)

This invention relates to driving mechanism for cycles and particularly to epicyclic variable speed gearing in a coaster brake drive for cycles.

An object of the invention is to provide multi-speed drive for cycle hubs.

Another object is to provide a simply constructed three speed gearing for a cycle and which will give a wide range in driving ratios.

A further object is to provide in a multispeed cycle hub drive manually controlled preselecting gear shift mechanism which will automatically shift the multispeed drive to a preselected gear ratio when driving pressure to the hub is momentarily relieved.

To these ends and also to improve generally upon devices of this character, the invention consists in the various matters hereinafter described and claimed. In its broader aspects, the invention is not necessarily limited to the specific constructions selected for illustrative purposes in the accompanying drawings in which:

Figure 1 is a longitudinal section showing the drive in low speed position;

Figure 2 is a fragmentary perspective view showing the arrangement of the variable speed gearing;

Figure 3 is a fragmentary section illustrating the gearing in neutral position between low and normal gears;

Figure 4 is a fragmentary section showing the gearing in normal gear position;

Figure 5 is a fragmentary section showing the gearing in neutral position between normal and high gears;

Figure 6 is a fragmentary section showing the gearing in high gear position;

Figure 7 is a cross sectional view on the line 7—7 of Figure 1;

Figures 8 and 9 are fragmentary perspective views of the axle securing mechanisms at each end of the axle;

Figure 10 shows the cable control mechanism attached to a bicycle;

Figure 11 is a side elevation of the manual gear shift control which is broken away to show its operation; and Figure 12 is an end elevation of the manual gear shift control.

Generally considered, I have provided a multi-speed coaster brake wherein a forwardly driven sprocket 10 acts through a selective multi-speed drive to rotate a wheel hub 11 containing a coaster brake having braking mechanism controlled by rearwardly turning the sprocket, as by the back-pedalling of a bicycle crank. A conveniently located manual control mechanism 12, which may be on one of the handle bars, is used to preselect the desired gear ratio in the driving mechanism, and this preselected gear shift is automatically and rapidly effected when a change in driving pressure occurs between the driving sprocket 10 and the driven hub 11.

In the illustrated embodiment, my cycle drive has a low gear, Fig. 1, normal gear, Fig. 4, and a high gear, Fig. 6. An antifriction bearing cone 15, adjustably threaded on one end of an axle 16 extending through the hub 11, has an anchoring projection 17, extending through a dust cap 18, which non-rotatably sockets in an anchoring arm 20 clamped at its outer end to a bicycle frame. A clamping nut 22 engages the arm 20 and the usual fork (not shown) is adapted to be clamped against it by a nut 23 and a washer. The bearing cone 15, has an enlarged portion provided with a raceway for spaced balls of a bearing 25, these balls also running in a raceway in the end of the tubular wheel hub 11. The dust cap 18 overlies the end of the hub to prevent entrance of dirt into the bearing 25. Spoke flanges 26 and 27 project from the hub near its ends and are provided with the usual chamfered spoke receiving holes 30. Three circumferentially spaced keyways 32, cut longitudinally within the interior of the hub, slidably receive radially projecting lugs 33 on axially movable brake discs 35 which loosely surround a reduced sleeve extension 36 of the bearing cone 15. The brake discs 35 alternate with axially movable brake discs 37 which are held from rotation by slidable interlocking engagement with flattened surfaces 38 on the sleeve extension 36. A brake disc actuating ring 40 non-rotatably and slidably fits over the end of the sleeve extension 36 and applies braking to the hub by clamping the brake discs into frictional engagement with each other between this ring 40 and a flat shoulder 41 on the bearing cone 15. A peripheral groove in the ring 40 receives a lag spring or retarder 42 which has a lug 43 entering an axial slot in a shiftable connector 45 that has an external conical clutch surface arranged to be entered into and out of driven engagement with a conical clutch surface 46 within the hub 11. Circumferentially spaced teeth axially projecting from one end of the connector 45 are arranged to engage between similar teeth 48 on the actuating ring 40 when the brake is applied.

Steeply pitched internal threads on the connector 45 interfit with external threads 50 on a rotatable controlling member 51 spaced about the axle and having intermediate of its ends an annular raceway receiving a row of spaced balls of a bearing 52, these balls rollingly engaging a raceway in the end of the wheel hub 11. The controlling member 51 has a hollow enlarged portion 53 beyond the end of the hub, this enlarged portion being provided with a sleeve 54 axially extending from a generally radially disposed wall closely spaced to the end of the hub and having an annular projection 56 overlying the hub end to prevent entrance of dirt into the bearing 52. The outer end of the sleeve 54 has an internal annular raceway receiving spaced bearing balls of a bearing 58 these balls rolling within a cone raceway on a carrier 57 which also has an internal raceway rotatably supported through the spaced balls of a bearing 60, these balls also rolling on a raceway on a cone member 62 which is rigidly and non-rotatably secured to the axle 16 as by brazing. The driving sprocket 10 is socketed in driving engagement with a reduced portion 64 of the carrier 59 and is demountably held in position by a clamping nut 65 provided with a dust shield 66 that protects the bearing 60. The sprocket 10 is offset in closely spaced overlying relation to the sleeve 54 to protect the bearing 58, these balls rolling within a cone raceway on a carrier to be engaged by a driving chain (not shown). To minimize axle torque, the axle 16 is also non-rotatably and demountably secured to the right hand side of the rear bicycle fork, as best illustrated in Figure 9. A circumferentially disposed set of teeth 67, projecting from the outer end of the cone member 62 interfit with a similar set of teeth on a washer 68 held against the slotted rearward frame end by an axle nut 69 and a washer, the washer 68 being provided with a slabbed-off projection 70 which non-rotatably interfits within a slot 72 in the rear fork of the bicycle frame.

A reduced sleeve extension 74 of the cone member 62 fits over and is secured to the axle as by brazing. An axial bore 75 extending into the right-hand axle end, as viewed in Figure 1, is interrupted intermediate of its ends by a diametrical slot 76 which also diametrically extends through the surrounding sleeve 74. A sun gear 78, journalled on and axially shiftable on this sleeve 74, has at its ends identical sets of gear teeth 79 and 80, these sets of gear teeth being spaced by an intermediate cylindrical portion 84 having a diameter slightly less than the root diameter of these teeth, as best shown in Figure 2. A pair of similar flat plates 86 and 87, slidable within the slot 76, extend in reversed relation to each other in loosely fitting engagement within the sun gear 78, and preferably are arranged to abut each other at their inner ends. The flat plate 86 has a pair of lugs 88 overlapping one end of the sun gear and a similar pair of lugs 89 on the plate 87 overlap the other end of the sun gear. A coiled spring 94, extending into a recess in the plate 86, is axially compressed between the plate and the inner end of this bore, and a similar but stronger coiled spring 95, entering a recess in the plate 87, is axially compressed between the plate 87 and an adjustable plug 96 threaded into the outer end of the axle. A shifter rod 98, operable in a manner to be later described, slidably extends through the plug 96, the spring 95 and the plate 87 and is threaded to a generally rectangular block 100 which interfits within cooperating opposed recesses in the plates 86 and 87.

My epicyclic variable speed gearing includes a set of circumferentially spaced stepped planetary pinions 104, journalled on studs 105 projecting inwardly from the carrier 59, each pinion having a set of teeth 106 and another set of teeth 107 of lesser number and having a smaller pitch diameter than that of the teeth 106. A ring of gear teeth 109, projecting inwardly from the sleeve 54, always meshes with the planetary pinion teeth 106 which are also meshed with the sun gear teeth 79 during low and normal gears (Figures 1 and 4). The pinion teeth 107 always mesh with an outer set of teeth 110 on a ring gear 111 that serves as a supplemental sun gear and has an internal set of teeth 112 with which the sets of sun gear teeth 79 and 80 may be selectively engaged as shown in Figures 1 and 6. By using this supplemental sun gear 111, the effective pitch diameter at each end of the sun gear may be selectively changed to provide the necessary compact change speed gearing having a series of driving ratios that would normally require two planetary gear trains. The supplemental sun gear 111 is axially located by the annular end of the cone member 62 and by intermediate shoulders on the planetary pinions 104. A set of internal teeth 114 on the non-rotatable cone member 62, arranged to be engaged by the sun gear teeth 80, which serve as clutch teeth, during normal and high gears (Figures 4 and 6), extend from a cone member counterbore 115 wherein the sun gear clutch teeth 80 momentarily locate (Figure 3) out of engagement with the supplemental sun gear and out of engagement with the cone member teeth 114 during a gear shift between low gear (Figure 1) and normal gear (Figure 4). Similarly, an intermediate cylindrical portion 118 on each planetary pinion and having a diameter slightly less than the root diameter of each set of pinion teeth 106 is of sufficient width so that the sun gear teeth 79 will be momentarily disengaged (Figure 5) from the sets of pinion teeth 106 and from the supplemental sun gear 111 during a gear shifting between normal gear (Figure 4) and high gear (Figure 6). The sun gear is smoothly shifted into non-clashing gear engagement since in moving through the neutral positions of Figures 3 and 5 it momentarily disengages one driving relation before it immediately engages another.

A nut 120, threaded into bottoming relation on the axle 16 and extending beyond the axle, has a bore 121 merging into a bell mouth 122 which slidably guides a chain 124 that is pivotally connected at its inner end to the shifter rod 98 and is pivotally connected at its outer end to a screw 125. An adjustable coupling nut 127, threaded on the screw 125 and held in adjustment by a locknut 128, is rotatably secured to the lower end of a flexible wire cable 130 which is conveniently guided adjacent to the bicycle frame by a pulley in a bracket clamped to the frame, the upper cable end being slidable through a flexible casing 132 and operatively connected to the hand lever control mechanism 12 on the bicycle handlebar. A strap 133 tightly secures the lower end of the casing 132 to the bicycle frame. With the control mechanism 12 at normal gear position, the coupling nut 127 is initially adjusted to locate the sun gear 78 in its position of Figure 4, wherein the innermost end of the chain 124 is even with the end of the axle. A portion of the nut 120 is cut away to show this adjustment.

The control mechanism 12 includes a sheet metal casing 136 having spaced side walls 138 extending from an end wall 140 and demountably secured, as by a clamp 142 to the underside of the bicycle handlebar and adjacent to the usual hand grip 143. The end wall 140 is bored at 144 to demountably receive the reduced end of a bushing 146 secured to the upper end of the flexible casing 132, and a narrow open ended slot entering this bore slidably receives the cable 130 during mounting and demounting of the casing and the bushing 146. A shifter lever 148, which may be formed from sheet metal into a generally U-shaped cross section, has spaced side walls interconnected by a rounded bottom wall and has spaced quadrant portions 149 journalled on a cross pin 152 mounted in the side walls 138. A rearwardly and downwardly projecting portion of this lever extends beneath the handgrip 143 and may be conveniently grasped by the rider's fingers and swung upwardly while his hand remains on the steering grip 143. An arcuate groove 153 at the bottom of the quadrant portions 149 guides the flexible cable 130 which is demountably secured to the shifter lever 148 by a lug 154 fastened on the cable end and demountably held between the shifter lever side walls. This lug is demountably received through a side wall bore 155 and the cable is removably received through a slot at the end of the groove 153 and through a connecting side wall slot opening into the bore 155. A spring-pressed pawl 158 on a pivot pin in the casing detachably engages against a quadrant shoulder 160 to locate the shifter lever 148, under tension of the cable 130, in its full line low gear position indicated at L, and this pawl is successively ratcheted into detachable engagement with spaced quadrant teeth 162 and 163 as the shifter lever is swung upwardly and counterclockwise to the normal gear position N and then to the high gear position H. A release lever 166, pivoted on the pin 152 and operated by a light downward pressure on a lateral projection 167, easily engaged by the rider's thumb or by a finger while holding the grip 143, has a struck-out projection 170 loosely received in a bore in the shifter lever 148 to provide for a limited lost motion movement between these levers. The release lever 166 has a pawl-engageable shoulder corresponding to the shoulder 160 and has spaced camming teeth 171 and 172 normally located slightly rearwardly of the teeth 162 and 163 in a counterclockwise direction.

When the shifting lever 148 is lifted from its full-line illustrated low gear position L to its higher gear positions, the teeth 171 and 172 will not interfere with the selected locking engagement of the shifter lever teeth 162 and 163 against the pawl 158. When the shifter lever 148 is in high gear position, a light downward pressure on the lateral projections 167 shifts the release lever 166 through its lost motion and causes the tooth 172 to cam the pawl out of engagement with the shifter lever tooth 163. The tensioned cable 130 quickly swings the shifter lever 148 downwardly until the pawl engages the tooth 162 and holds the shifter lever in its normal gear position N. A further light downward pressure on the lateral projection 167 will bring the tooth 171 into release camming engagement with the pawl 158 and the tensioned cable 130 will quickly swing the shifter lever 148 downwardly until the pawl engages the shoulder 160 and locates the shifting lever in its low gear position L.

In the indicated low gear position of Figure 1, the tension on the cable 130 is released and spring 95, which is stronger than spring 94, has shifted the sun gear 78 to its extreme left position wherein the sun gear teeth 79 will be meshed with the teeth 106 of all the planetary pinions 104 and at the same time the sun gear clutch teeth 80 will engage the supplemental sun gear teeth 112. With this arrangement, the planetary pinions will be locked against rotation on their studs 105, since the pinions 104 cannot be driven simultaneously at different speeds, and forward rotation of the sprocket 10 causes all driving parts to turn as a single unit including the controlling member 51 and its threads 50 which shift the connector 45 into hub-driving engagement.

When the sun gear 78 is positioned in any of its low, normal or high gear positions and when the forward driving rotation of the sprocket 10 is stopped, the connector 45 will partially unwind on the threads 50 and declutch from the hub 11 permitting the hub to overrun and freely coast. Also, in any of these gear positions, when the sprocket 10 is rearwardly turned, the connector 45 is moved by the threads 50 into engagement with the brake actuating ring 40 causing the brake discs 35 and 37 to be frictionally clamped together producing the desired hub braking action.

When the shifter lever 148 is moved to normal gear position, the shifter rod 98 acting through the block 100 shifts the plate 87 towards the right and the spring 94 acting through the plate 86 shifts the sun gear 78 quickly through the first neutral position of Figure 3 to the normal gear position of Figure 4 wherein the sun gear is locked against rotation by engagement of its clutch teeth 80 with the fixed internal teeth 114 on the cone member 62. Forward rotation of the sprocket 10 and its carrier 59 now causes a planetary movement of the pinions 104 on the sun gear teeth 79 and transmits an overdrive through the gear teeth 109 to the controlling member 51 which acts through the connector 45 to drive the hub 11.

When the shifter lever 148 is moved to high gear position, the shifter rod 98 and the block 100 move the plate 87 to its extreme right hand position and the spring 94 and the plate 86 shift the sun gear 78 quickly through the second neutral position of Figure 5 to the high gear position of Figure 6 wherein the sun gear 78 is still held non-rotatable by the teeth 114 and the sun gear teeth 79 interlock with the supplemental sun gear 111. Forward sprocket rotation at the previous rate now causes an even faster rotation of the pinions 104 through the planetary movement of their teeth 107 in engagement with the teeth 110 of the now non-rotating supplemental sun gear 111, all resulting in a further overdrive to the controlling member 51 and the hub 11.

In the illustrated gear ratios and when the sprocket 10 rotates at a fixed rate, low gear provides a 25 percent gear reduction from normal gear and high gear provides a 33⅓ percent gear increase over normal gear.

When the shifter lever 148 is released to a lower gear position, the spring 95, being stronger than the spring 94, acts through the plate 87 to shift the sun gear 78 towards the left through one or both neutral positions to the position limited by the block 100 under control of the preset shifter lever. The shifter lever 148, which may be operated at any time, is most frequently used to preselect the desire gear change while driving power is being applied to the sprocket 10, this change of gear being automatically effected subsequently when the driving pressure between the sprocket and hub is momentarily relieved. When the shifter lever is moved to a higher gear position, the plate 87 is partially withdrawn from the sun gear 78. Due to the driving pressures against the sun gear teeth, the shifting of the sun gear to the higher gear position by the spring 94 is delayed until the rider momentarily relieves the driving pressure on the sprocket 10. Similarly, when the shifter lever is moved to a lower gear position and provides slack in the cable 130, the sun gear 78 does not shift to its preselected lower gear position until the driving pressures between the sprocket and hub are momentarily relieved at which time the shifting is quickly effected by the spring 95 and plate 87 to the preselected position limited by the block 100. Since with each gear shift the sun gear goes through at least one of the neutral positions of Figures 3 and 5, the gear change occurs quickly and without the clashing of gear teeth. This preselection of gear change facilitates gear shifting without loss of momentum in a bicycle. For example, a bicycle rider upon approaching a hill may release his shifter lever 148 to the low gear position L and may thereafter cause the actual shift of the sun gear to take place by momentarily relieving his pedalling pressure when pedalling up the hill becomes difficult.

I claim:

1. In a device of the character indicated, a cycle hub, a rotatable controlling member for controlling driving of the hub, an internal gear portion on the controlling member, a rotatably driven carrier projecting into the controlling member, a plurality of stepped planetary pinions rotatable on the carrier, each planetary pinion having a similar set of gear teeth meshing with the internal gear, each pinion also having a second set of gear teeth axially spaced from and having a different pitch circle from that of its first set of teeth, a ring gear meshed with said second sets of pinion teeth and having a set of internal teeth, a rotatable sun gear, a non-rotatable set of clutch teeth engageable with the sun gear, means to shift the sun gear into simultaneous operable engagement with the ring gear and with the planetary pinions or into selectively operable engagement with the planetary pinions or the ring gear and into engagement with said clutch teeth to provide different predetermined gear ratios between the carrier and the controlling member, and means disengaging the sun gear from operable engagement during its shift between each of said driving ratios.

2. In a device of the character indicated, a cycle hub, a rotatable controlling member projecting within the hub for controlling driving of the hub, the controlling member having an axial extension provided with an enlarged portion outside of the hub, the enlarged portion having an internal gear, a rotatably driven carrier extending into the enlarged portion, a plurality of stepped planetary pinions rotatable on the carrier, each pinion having a set of gear teeth meshing with the internal gear, each pinion also having a second set of gear teeth on a different pitch circle from that of its other set of gear teeth, a supplemental sun gear meshing with said second sets of pinion teeth and having internal teeth, a rotatable sun gear within the supplemental sun gear, gear shifting mechanism for shifting the sun gear to predetermined positions into and out of operative engagement with the supplemental sun gear and into and out of operative engagement with the planetary pinions to provide different predetermined gear ratios between the carrier and the controlling member, and means disengaging one sun gear operative relation before it engages another operative relation.

3. In a device of the character indicated, a cycle hub, a rotatable controlling member for controlling driving of the hub, an internal gear portion on the controlling member, a rotatably driven carrier projecting into the controlling member, a plurality of stepped planetary pinions rotatable on the carrier, each pinion having a set of gear teeth meshing with the internal gear and a second set of teeth of a different number from that of its first-mentioned teeth, a supplemental sun gear meshed with said second sets of teeth and having internal teeth, a rotatable and axially shiftable sun gear within the supplemental sun gear, the sun gear having two axially spaced sets of gear teeth, shifting mechanism for axially shifting the sun gear to predetermined positions into and out of operative engagement with the supplemental sun gear and into and out of meshed engagement with the planetary pinions to provide different predetermined gear ratios between the carrier and the controlling member, and means disengaging one of the sets of teeth on the sun gear from operative relation during a portion of each gear shifting operation.

4. In a device of the character indicated, a cycle hub, a rotatable controlling member for controlling driving of the hub, an internal gear portion on the controlling member, a rotatably driven carrier projecting into the controlling member, a plurality of stepped planetary pinions rotatable on the carrier, each pinion having a set of gear teeth meshing with the internal gear and having a second set of teeth of a different number from that of its first-mentioned teeth, a supplemental sun gear meshed with said second sets of pinion teeth and having internal teeth, a rotatable and axially shiftable sun gear within the supplemental sun gear, two axially spaced sets of teeth on the shiftable sun gear, gear shifting mechanism for shifting the sun gear to predetermined positions into and out of operative engagement with the supplemental sun gear and into and out of operative engagement with the planetary pinions to provide different gear ratios between the carrier and the controlling member, means engageable with one of said sets of teeth preventing rotation of the shiftable sun gear in at least one of its predetermined positions, and mechanism temporarily disengaging one of said sets of teeth on the shiftable sun gear from operative relation during a portion of each gear shifting operation.

5. In a device of the character indicated, a cycle hub having a coaster brake, an axle, a rotatable controlling member projecting within the hub to selectively control driving and braking, an enlarged portion on the controlling member outside of the hub and having an internal gear, a rotatably driven carrier projecting into the enlarged portion, studs on the carrier, a stepped planetary pinion journalled on each stud, each pinion having a set of gear teeth meshing with the internal gear and having a second set of gear teeth different in number from its first-mentioned set of teeth, a ring gear meshing with said second sets of planetary pinion teeth and having internal teeth, an axially shiftable sun gear rotatable about the axle and having two sets of teeth including a set of clutch teeth, and gear shifting mechanism for shifting the sun gear to predetermined positions into and out of operative engagement with either or both the ring gear and the planetary pinions.

6. In a device of the character indicated, a cycle hub having a coaster brake, an axle, a rotatable controlling member projecting within the hub to selectively control driving and braking, an enlarged portion on the controlling member outside of the hub and having an internal gear, a rotatably driven carrier projecting into the enlarged portion, studs on the carrier, a stepped planetary pinion journalled on each stud, each pinion having a set of gear teeth meshing with the internal gear and having a second set of teeth differing in number from its first-mentioned set of teeth, a supplemental sun gear meshing with each of said second sets of teeth and having internal teeth, an axially shiftable sun gear rotatable about the axle and having two spaced sets of teeth including a set of clutch teeth, gear shifting mechanism for selectively shifting the sun gear into predetermined operative relations with the supplemental sun gear and with the planetary pinions and providing three different gear ratios between the rotatably driven carrier and said rotatable controlling member, means temporarily disengaging the sun gear from operative relation during a portion of each gear shifting operation, and an axle-supported member locking the sun gear against rotation in two of said driving relations.

7. In a device of the character indicated, a cycle hub, a rotatable controlling member for controlling hub driving, the controlling member having an internal gear, a rotatably driven carrier, a plurality of planetary pinions rotatable on the carrier, each pinion having a first set of gear teeth meshing with the internal gear and having a second set of gear teeth of lesser number than its first set of teeth, a cylindrical land on each pinion between its sets of teeth and having a diameter intermediate between that of the root diameter of its first set of teeth and the outside diameter of its second set of teeth, a ring gear externally meshing with said second sets of pinion teeth and having an internal set of teeth, a rotatable and axially shiftable sun gear within the ring gear and having two similar axially spaced sets of teeth separated by a cylindrical portion of a diameter less than the root diameter of its sets of teeth, a non-rotatable member having internal teeth engageable with one of the sets of sun gear teeth and axially spaced from the ring gear by a distance exceeding the width of one of the sets of sun gear teeth, the other set of sun gear teeth having a width less than the distance between the ring gear and the first set of planetary pinion teeth, and mechanism for shifting the sun gear into and out of planetary pinion engagement and into and out of ring gear engagement and into and out of engagement with the internal teeth on said non-rotatable member.

8. In a device of the character indicated, a cycle hub, a rotatably driven member, a change-speed drive between the driven member and the hub and including a gear shiftable to different predetermined operative positions to provide different gear ratios between the rotatably driven member and the hub, a pair of opposed locating members respectively slidably extending into the opposite ends of the gear, each locating member having a gear-positioning shoulder, opposed springs urging said locating members into the gear, and gear shifting mechanism including a shifting member between and selectively operating the locating members for effecting a partial withdrawal of one locating member from the other locating member and from the gear to one of a plurality of predetermined positions, the gear being subsequently shifted into engagement with the withdrawn locating member by the other spring-urged locating member.

References Cited in the file of this patent

UNITED STATES PATENTS

| | | |
|---|---|---|
| 525,479 | Wolf | Sept. 4, 1894 |
| 698,132 | Palmer | Apr. 22, 1902 |
| 865,805 | Sangster | Sept. 10, 1907 |
| 1,666,793 | Sanginnetti | Apr. 17, 1928 |
| 2,228,006 | Giacy | Jan. 7, 1941 |
| 2,237,581 | Schwinn | Apr. 8, 1941 |
| 2,494,558 | Irwin | Jan. 17, 1950 |
| 2,509,721 | Brow | May 30, 1950 |

FOREIGN PATENTS

| | | |
|---|---|---|
| 12,384 | Great Britain | June 18, 1901 |
| 17,709 | Denmark | Aug. 12, 1913 |
| 182,568 | Switzerland | Feb. 15, 1936 |
| 417,272 | Great Britain | Oct. 2, 1934 |
| 449,850 | Great Britain | July 6, 1936 |